(12) United States Patent
Blom et al.

(10) Patent No.: US 9,323,232 B2
(45) Date of Patent: Apr. 26, 2016

(54) TRANSPORTION REMOTE CALL SYSTEM BASED ON PASSENGER GEO-ROUTINES

(75) Inventors: Jan O. Blom, Lutry (CH); Julian Charles Nolan, Pully (CH)

(73) Assignee: Nokia Technologies Oy, Espoo (FI)

( * ) Notice: Subject to any disclaimer, the term of this patent is extended or adjusted under 35 U.S.C. 154(b) by 782 days.

(21) Appl. No.: 13/418,789

(22) Filed: Mar. 13, 2012

(65) Prior Publication Data

US 2013/0245832 A1 Sep. 19, 2013

(51) Int. Cl.
| B66B 1/18 | (2006.01) |
| G05B 13/00 | (2006.01) |
| B66B 1/00 | (2006.01) |
| G06Q 10/00 | (2012.01) |

(52) U.S. Cl.
CPC . *G05B 13/00* (2013.01); *B66B 1/00* (2013.01); *G06Q 10/00* (2013.01); *B66B 2201/4615* (2013.01); *B66B 2201/4653* (2013.01)

(58) Field of Classification Search
CPC .................. B66B 2201/232; B66B 2201/234; B66B 2201/235; B66B 2201/402; B66B 2201/4615; B66B 2201/4653; B66B 1/00; G05B 13/00; G06Q 10/00
USPC ........................... 187/247, 380–388, 391–393
See application file for complete search history.

(56) References Cited

U.S. PATENT DOCUMENTS

| 5,412,163 A * | 5/1995 | Tsuji ............................. 187/382 |
| 5,984,051 A * | 11/1999 | Morgan .................. B66B 1/468 187/316 |
| 6,109,396 A * | 8/2000 | Sirag et al. .................... 187/381 |
| 6,202,799 B1 * | 3/2001 | Drop ............................. 187/388 |
| 6,209,685 B1 * | 4/2001 | Zaharia et al. ................ 187/392 |
| 6,257,373 B1 * | 7/2001 | Hikita et al. ................. 187/392 |
| 6,382,363 B1 * | 5/2002 | Friedli ......................... 187/384 |
| 6,772,862 B2 * | 8/2004 | Friedli ......................... 187/247 |
| 7,328,775 B2 * | 2/2008 | Zaharia et al. ............... 187/396 |
| 7,353,915 B2 * | 4/2008 | Zaharia et al. ............... 187/388 |
| 7,500,544 B2 * | 3/2009 | Hakala et al. ................ 187/382 |
| 7,552,800 B2 * | 6/2009 | Puskala et al. ............... 187/384 |
| 7,562,746 B2 * | 7/2009 | Yoshikawa et al. ........... 187/382 |
| 7,581,622 B2 * | 9/2009 | Amano ......................... 187/384 |
| 7,712,586 B2 * | 5/2010 | Legez ........................... 187/391 |
| 7,882,938 B2 * | 2/2011 | Blackaby et al. ............. 187/388 |
| 7,936,249 B2 * | 5/2011 | Friedli ......................... 340/5.5 |

(Continued)

FOREIGN PATENT DOCUMENTS

| GB | 2475147 A | 5/2011 |
| KR | 2007-0024579 A | 3/2007 |

*Primary Examiner* — Anthony Salata
(74) *Attorney, Agent, or Firm* — Harrington & Smith (57) ABSTRACT

In accordance with exemplary embodiments there is determining geo-routines of a user, the geo-routines based on at least one of a location and an altitude and a trajectory of the user, recording the determined geo-routines of user of the system; and based on a current trajectory of a user indicating that the user is going to use a transportation system, optimizing a use of the system according to the recorded geo-routines of the user of the system. In addition, sending information including a location and/or an altitude of a user, and a trajectory of the user, the information associated with a current geo-routine of the user, and receiving information to optimize the use of a transportation system, the receiving based on a current trajectory indicating that the user is going to use the transportation system and on the current geo-routine and/or historical geo-routines of a user of the transportation system.

27 Claims, 7 Drawing Sheets

(56) References Cited

U.S. PATENT DOCUMENTS

| | | | |
|---|---|---|---|
| 8,061,485 B2 * | 11/2011 | Finschi | 187/384 |
| 8,210,321 B2 * | 7/2012 | Finschi | B66B 1/14 |
| | | | 187/388 |
| 8,381,880 B2 * | 2/2013 | Finschi | 187/388 |
| 8,439,169 B2 * | 5/2013 | Iio et al. | 187/387 |
| 8,490,754 B2 * | 7/2013 | Amano | 187/384 |
| 8,525,652 B2 * | 9/2013 | Takeuchi | 340/286.06 |
| 8,573,366 B2 * | 11/2013 | Elomaa et al. | 187/387 |
| 2002/0032539 A1 | 3/2002 | Tsuji | 702/139 |
| 2005/0263355 A1 * | 12/2005 | Kostka | 187/382 |
| 2007/0168124 A1 | 7/2007 | Dossas et al. | 701/213 |
| 2011/0106449 A1 | 5/2011 | Chowdhary et al. | 701/214 |
| 2011/0200023 A1 | 8/2011 | Murray et al. | 370/338 |
| 2013/0048436 A1 * | 2/2013 | Chan | B66B 1/2408 |
| | | | 187/387 |

* cited by examiner

TRANSPORTION REMOTE CALL SYSTEM BASED ON PASSENGER GEO-ROUTINES

TECHNICAL FIELD

The teachings in accordance with the exemplary embodiments of this invention relate generally to optimizing scheduling and, more specifically, relate to using determined geo-routines of users of mobile devices to optimize scheduling of user transportation systems.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
MD mobile device
NFC near field communication
WLAN wireless local area network
XY horizontal coordinates
Z trajectory coordinate As urban populations grow in size, density and prosperity the use of transportation systems such as elevators is increasing in both commercial and residential buildings. With regards to elevators, users utilize elevators to travel between the floors of a building, frequently navigating between different floors many times as day as they, for example, travel to a place of work, between offices or return home to their apartment.

Much work has been conducted into the optimal scheduling of elevators to try and maximize their availability to users, while minimizing travel time. This has helped to improve convenience to users in the use of elevators, ensuring that travel and waiting times are minimized.

SUMMARY

In accordance with an exemplary aspect of the invention, there is a method comprising: determining geo-routines of at least one user of transportation system, where the geo-routines are based on at least one of a location and an altitude of the at least one user and a trajectory of the at least one user of the transportation system; recording the determined geo-routines of the at least one user of the system; and based on a determination that a current trajectory of a user of the at least one user is indicating that the user is going to use the transportation system, optimizing a use of the system according to at least the recorded geo-routines of the at least one user of the system.

In accordance with an exemplary aspect of the invention, there is an apparatus comprising: at least one processor; and at least one memory including computer program code, where the at least one memory and the computer program code are configured, with the at least one processor, to cause the apparatus to at least: determine geo-routines of at least one user of transportation system, where the geo-routines are based on at least one of a location and an altitude of the at least one user and a trajectory of the at least one user of the transportation system; record the determined geo-routines of the at least one user of the system; and based on a determination that a current trajectory of a user of the at least one user is indicating that the user is going to use the transportation system, optimize a use of the system according to at least the recorded geo-routines of the at least one user of the system.

In accordance with an exemplary aspect of the invention, there is an apparatus comprising: means for determining geo-routines of at least one user of transportation system, where the geo-routines are based on at least one of a location and an altitude of the at least one user and a trajectory of the at least one user of the transportation system; means for recording the determined geo-routines of the at least one user of the system; and means, based on a determination that a current trajectory of a user of the at least one user is indicating that the user is going to use the transportation system, for optimizing a use of the system according to at least the recorded geo-routines of the at least one user of the system.

In accordance with the paragraph above, the means for determining and optimizing comprises at least one processor and a computer readable memory including computer program code, the computer program code executed by the at least one processor; where the means for recording comprises a database at least one of internal and external to the apparatus.

In accordance with another exemplary aspect of the invention, there is a method comprising: sending, with a mobile device, information comprising at least one of a location and an altitude of a user of the mobile device, and a trajectory of the user of a transportation system, where the information is associated with a current geo-routine of the user; and receiving information to optimize a use of a transportation system by the user, the receiving based on a current trajectory of a user indicating that the user is going to use the transportation system and the information based on at least one of the current geo-routine and historical geo-routines of at least one user of the transportation system.

In accordance with another exemplary aspect of the invention, there is an apparatus comprising: at least one processor; and at least one memory including computer program code, where the at least one memory and the computer program code are configured, with the at least one processor, to cause the apparatus to at least: send, with a mobile device, information comprising at least one of a location and an altitude of a user of the mobile device, and a trajectory of the user of a transportation system, where the information is associated with a current geo-routine of the user; and receive information to optimize a use of a transportation system by the user, the receiving based on a current trajectory of a user indicating that the user is going to use the transportation system and the information based on at least one of the current geo-routine and historical geo-routines of at least one user of the transportation system.

In accordance with still another exemplary aspect of the invention, there is an apparatus comprising: means for sending, with a mobile device, information comprising at least one of a location and an altitude of a user of the mobile device, and a trajectory of the user of a transportation system, where the information is associated with a current geo-routine of the user; and means for receiving information to optimize a use of a transportation system by the user, the receiving based on a current trajectory of a user indicating that the user is going to use the transportation system and the information based on at least one of the current geo-routine and historical geo-routines of at least one user of the transportation system.

In accordance with the paragraph above, the means for sending and the means for receiving comprise an interface to a wireless network and at least one processor and a computer readable memory including computer program code, the computer program code executed by the at least one processor.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, we propose using geo-routines of users to predict at least arrival times and destination/access points of the users of a transportation system in order to optimize system scheduling and use for the users of the system.

The invention may be expressed, for example, as follows: An apparatus and method to optimize the scheduling of a user transportation system according to the geo-routines of one or more users comprising: At least one user with a mobile device capable of determining its X-Y location and Z altitude and who has an associated trajectory in at least one of these dimensions. At least one transportation system using a control system having access to a means of wireless connectivity. Whereby, the user's historical geo-routine and current XYZ location and trajectory is used to determine and/or optimize scheduling of the transportation system. These XYZ values known from the Cartesian coordinate system.

Although the exemplary embodiments, as described below, will be discussed in respect to an elevator system the embodiments of the invention are not limited to use in only an elevator system. The exemplary embodiments of the invention can be practiced to the benefit of other transportation systems as well. For example, the embodiments in accordance with the invention can be used to the benefit of transportation systems such as, but not limited to, elevators, trams, trains, buses, and car pool systems, to name only a few. Thus, the embodiments as described below with respect to elevators are non-limiting and can be practiced with other different transportation systems as well.

As a non-limiting example, optimal scheduling of elevators to try and maximize their availability to users while minimizing travel time has helped to improve convenience to users in the use of elevators. However, there is little coordination between a user's geo-routine and the elevator which can form an integral part of their journey. Present scheduling methods for elevator systems include wirelessly communicating destination floors to elevator systems and determining altitude associated with the elevator as it travels. However, the present scheduling methods do not use geo-routines of users to predict future traffic based on user trajectories. As a result, even though elevator systems may have very sophisticated scheduling algorithms, no account is taken of the user's geo-routines, and in particular anchor points. These anchor points may be identified by radio fingerprints where the users enter and exit transportation vehicles, such as an elevator. Accordingly, the scheduling of the elevator cannot consider this information, ultimately resulting in longer wait times for users than would otherwise be possible, such as using the embodiments of the invention.

With the growing adoption of smartphones users are becoming accustomed to geo-navigation services which allow them to carry out their geo-routines with increasing efficiency. For example, users can be guided with the fastest and most direct route between buildings and transportation platforms for example. The invention provides at least a method and apparatus for a system incorporating a mobile device which can be used to optimize transportation system schedules according to the geo-routines of users. In accordance with the exemplary embodiments of the invention, using a combination of sensor information including radio fingerprinting, the geo-routine altitude (Z) preferences of a user are tracked together with the user's spatial (X-Y) geo-routines. By determining the current trajectory these are collectively utilized to anticipate present and future scheduling needs of users. As a result the scheduling of one or more systems may be optimized to provide an improved service level to users.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Figure 1A:
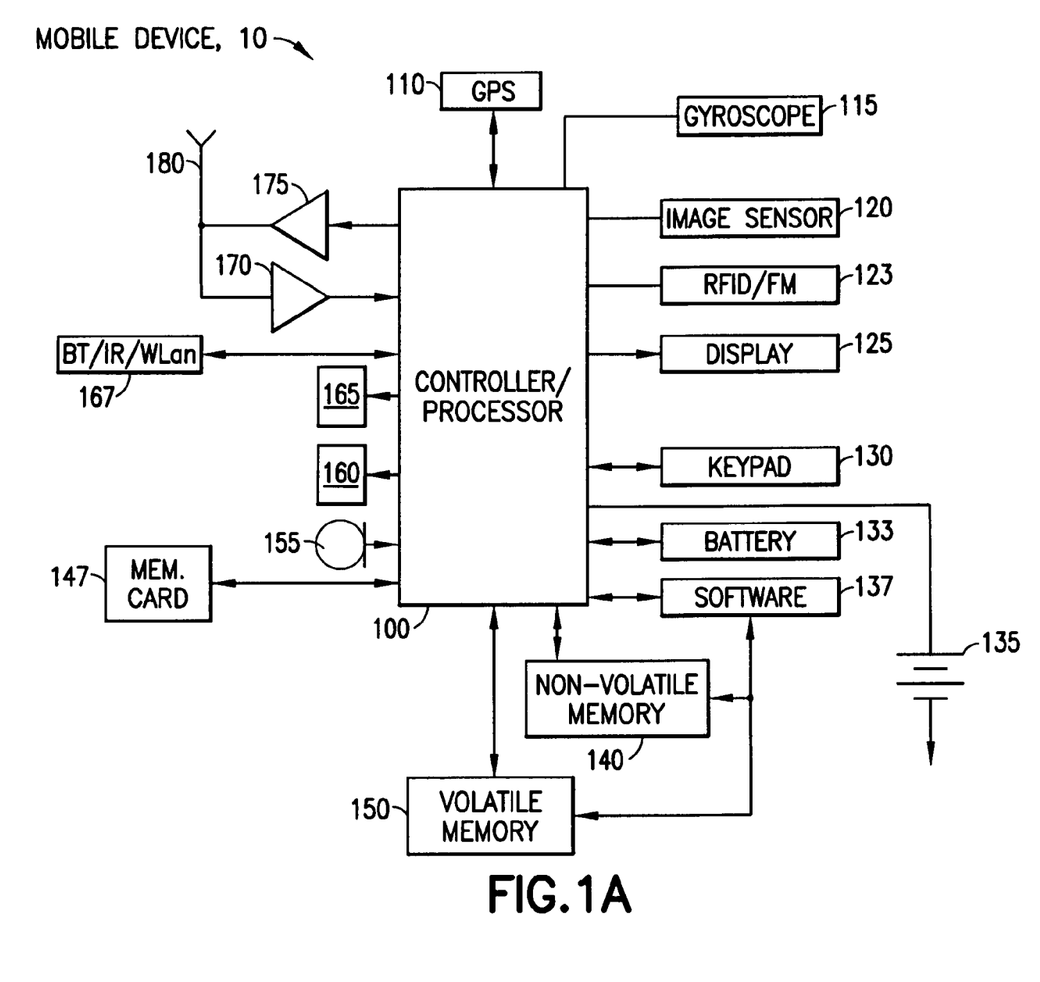
FIG. 1A shows a mobile device as one embodiment of a device for use in accordance with the exemplary embodiments of the invention.

FIG. 1A illustrates components of a mobile device (MD) 10 configured in accordance with the exemplary embodiments to perform operations including sensing its location both internally and externally to a building. In FIG. 1A there is illustrated a controller/processor 100. The controller/processor 100 may be of any type suitable to the local technical environment, and may include one or more of general purpose computers, special purpose computers, microprocessors, digital signal processors (DSPs) and processors based on multicore processor architecture, as non-limiting examples.

Figure 1B:
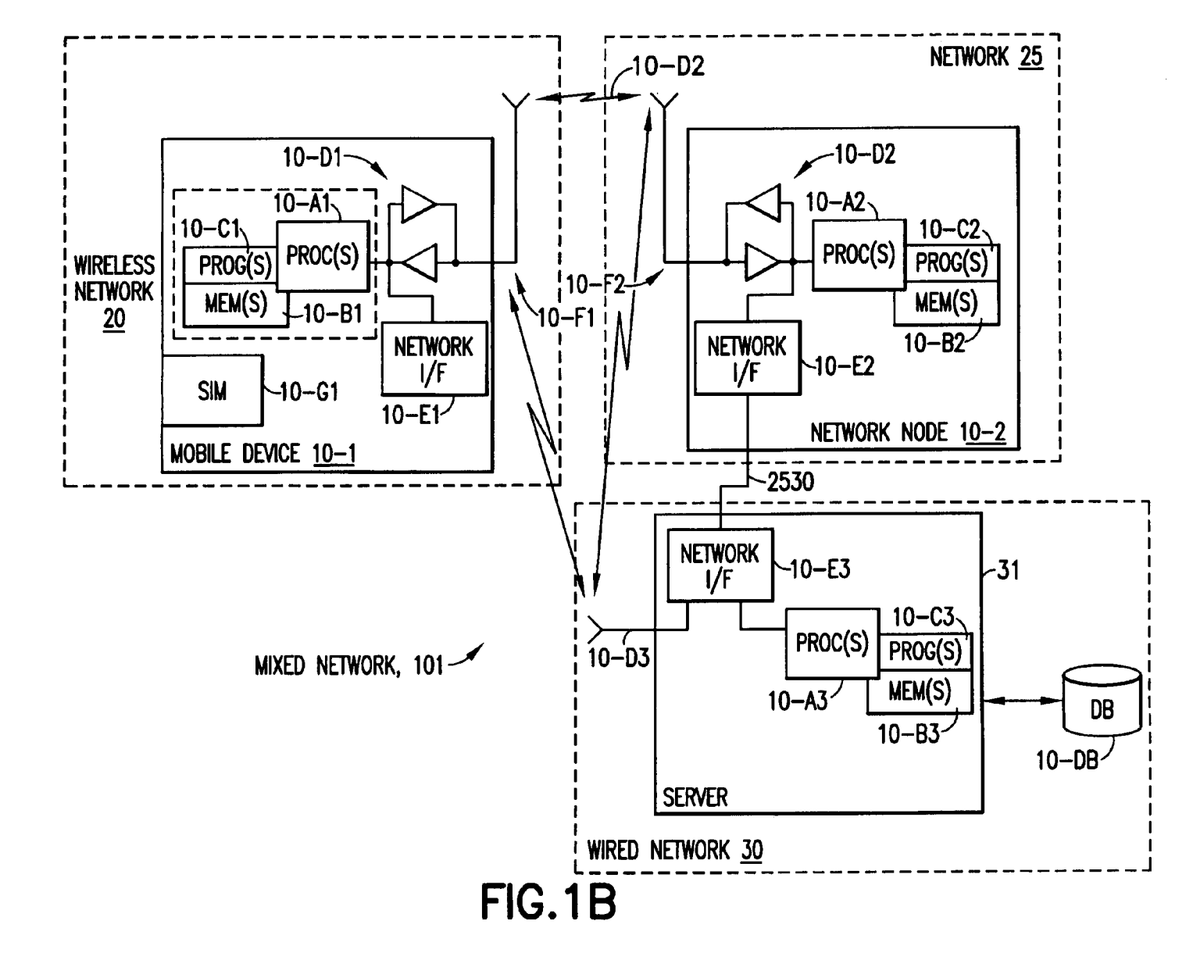
FIG. 1B shows a simplified block diagram of various electronic devices that are suitable for use in practicing the exemplary embodiments of this invention.

The MD 10 has a graphical display 125 and a keypad 130. The keypad 130 is understood as capable of encompassing touch-screen technology at the graphical display 125. A power actuator controls the device being turned on and off by the user. The example MD 10 may have one or more antennas 180 which may be transmit only, receive only or both transmit and receive antennas that are typically used for cellular and/or non-cellular communication or wireless connectivity and which may be implemented by any of the various the example embodiments shown at FIGS. 1-8. The MD 10 includes a receiver 170, or a transmitter 175, or both transmitter and receiver, or multiple incidences of either/both receiver and transmitter. There may be one or more secondary radios such as Bluetooth, IR or WLAN shown together as 167. Further, the MD 10 can include RFID, and/or FM 123 in embodiments which may or may not use embodiments of the invention.

As shown in FIG. 1A, the MD 10 includes a GPS 110 and/or a gyroscope 115. The GPS 110 and/or the gyroscope 115 can be configured, in accordance with the embodiments, to collect information for use in identifying the geo-routines of the user of the MD 10 including X, Y coordinates and Z trajectories. The MD 10 includes an operable ground plane 135 to which a combination of areas and/or a combination of components, modules, mechanical parts, as not limiting examples, may form the overall RF ground plane. The ground plane may be disposed on one or more layers of one or more printed wiring boards within the MD 10, and/or alternatively or additionally the ground plane may be formed from a solid conductive material such as a shield or protective case or it may be formed from printed, etched, molded, or any other method of providing a conductive sheet in two or three dimensions.

Throughout the apparatus are various memories such as volatile memory (e.g., random access memory RAM) 150, non-volatile (e.g., read only memory ROM) 140, and in some example embodiments removable memory such as the illustrated memory card 147 on which various programs of computer readable instructions such as the software 137 are stored. Further, at least the GPS 110 and the gyroscope 115 can be configured, with at least the controller 100 and/or software 137 stored in the non-volatile memory 140 and/or volatile memory 150 and/or in another memory medium of the MD 10, such as the memory card 147. The software executable by at least the controller/processor 100, to operate in accordance with the exemplary embodiments of the invention. Further, software 137 stored in memory of the MD 10 may be used for example, in accordance with the embodiments, to set the anchor and identify, create, report and/or compare the radio fingerprint profile(s) for the user of the MD 10. In addition, the MD 10 components include a battery 133. The battery 133 may be any power storage device. The MD 10 may include a microphone 155, a speaker 160 and/or a ringer 165. In addition, the MD can include an interface to a UM 145.

FIG. 1B shows a simplified block diagram of various electronic devices that are suitable for use in practicing the exemplary embodiments of this invention. FIG. 1B illustrates an overview of one environment where the exemplary embodiments of the invention for geo-routines of users may be practiced. FIG. 1B is a block diagram having an MD 10 communicating in a mixed network 101, for example. The mixed network 101 includes a wireless network 20, a wireless/wired network 25, and a wired network 30. It is noted that these networks as illustrated in FIG. 1B are non-limiting and in accordance with the exemplary embodiments there may be more or less networks and/or types of networks. The network 20 and 25 includes the MD 10 and the network node 10-2, respectively, in wireless communication. The network node 10-2 may be an access point or a router for example. In addition, the network 20 and the network 30 may communicate wirelessly. The MD 10 and/or the network node 10-2 and/or the network 30 may use any type of wireless communication, such as based on any one or a combination off 802.x, WLAN, Bluetooth, infra-red, etc. technologies. The wired network 30 includes network node 10-2 and 10-3 in wired communication.

The MD 10 can include, in addition to or instead of any one or more of the components of the MD 10 as described above, one or more controllers/processors 10-A1, one or more memories 10-B1 containing one or more programs 10-C1, a radio frequency transceiver 10-D1 able to receive and transmit data, a wired network interface 10-E1, and one or more antennas 10-F1. Similarly, the network node 10-2 includes one or more processors 10-A2, one or more memories 10-B2 containing one or more programs 10-C2, a radio frequency transceiver 10-D2 able to receive and transmit data, a wired network interface 10-E2, and one or more antennas 10-F2. Additionally, in the example shown in FIG. 1B, the server 31 includes one or more processors 10-A3, one or more memories 10-B3 containing one or more programs 10-C3, a wired network interface 10-E3. At least these components of the server 31 are configured and include means to perform the operations in accordance with the exemplary embodiments of the invention.

In addition, the MD 10, the network node 10-2, and/or the wired network 30 can include a near field communication (NFC) interface or module 10-G1, 10-G2, 10-G3, respectively, for use in the operations in accordance with the exemplary embodiments of the invention as described below. Further, MD 10 can be a cellular phone, other cellular device, and/or WLAN and/or Bluetooth device and the network node 10-2 could be an access point, a router or more than one access point and/or router. In addition, the network node 10-2 can comprise a base station. Further, as illustrated there may be a wireless connection 10-D2 and/or 10-D3 established between the network node 10-1 and the wired network 30, respectively, as well as a wired and/or wireless connection 2530 between the network node 10-2 and the wired network 30. Any of these connections may be used for communications in accordance with the exemplary embodiments of the invention.

The network node 10-2 and/or the server 31 may utilize an internal database and/or an external database 10-DB, in accordance with the embodiments. The internal and/or external database 10-DB may comprise VLR and/or database functionalities for use with at least software and data processing. Further, the network node 10-2 could be a computer or server, such as the server 31, in the wired and/or wireless network 30. FIG. 1B is merely illustrative of possible devices suitable for use in accordance with the exemplary embodiments.

As shown in FIG. 1B, there exist several interconnections between the network parts shown by corresponding arrows or lines. These interconnections may be established by means of interfaces or reference points which may be different in dependence of the employed network technology and which are known to those skilled in the art.

Figure 2A:
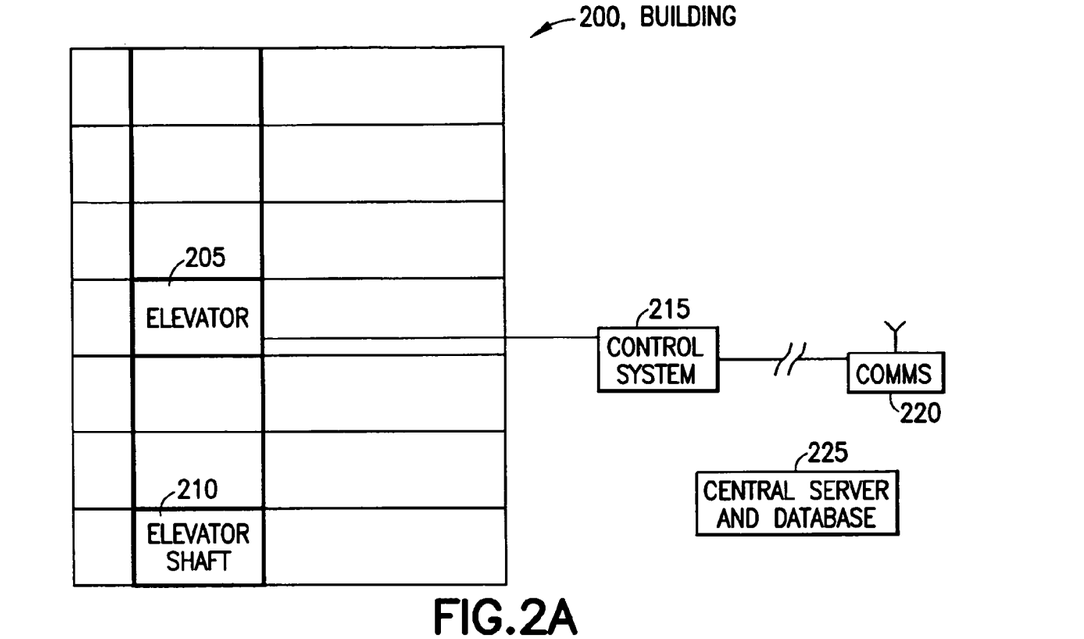
FIG. 2A shows an overview of elevator scheduling operations, in accordance with the embodiment.

FIG. 2A illustrates an overview of a location in which the exemplary embodiments may be practiced. The MD 10, capable of sensing its location both internally and externally to the building 200. The MD 10 is connected through wireless means to the control system 215 of one or more elevators 205 in the building 200 and/or to the server 31, such as in the wired/wireless network 30. Although there is displayed one elevator shaft 210 in FIG. 2A, the embodiments of the invention can be used with more than one elevator and/or more than one elevator shaft. Location sensing externally to a building is performed using for example the GPS 110, base station triangulation, such as by the network node 10-2 or another network node, and/or using other techniques. As described above, the server 31 and a database such as an internal or external database 10-DB includes means to process location based information. The information including historical XYZ geo-routines, current XYZ geo-routines, and/or elevator preferences of users of a mobile device, such as the MD 10. In addition, the server includes means and is configured to correlate these to the current geo-routines, which are also recorded, and trigger elevator events which are then passed to a dedicated elevator controller, such as the control system 215, for optimized scheduling of the elevator 205, as in accordance with the embodiments.

Figure 2B:
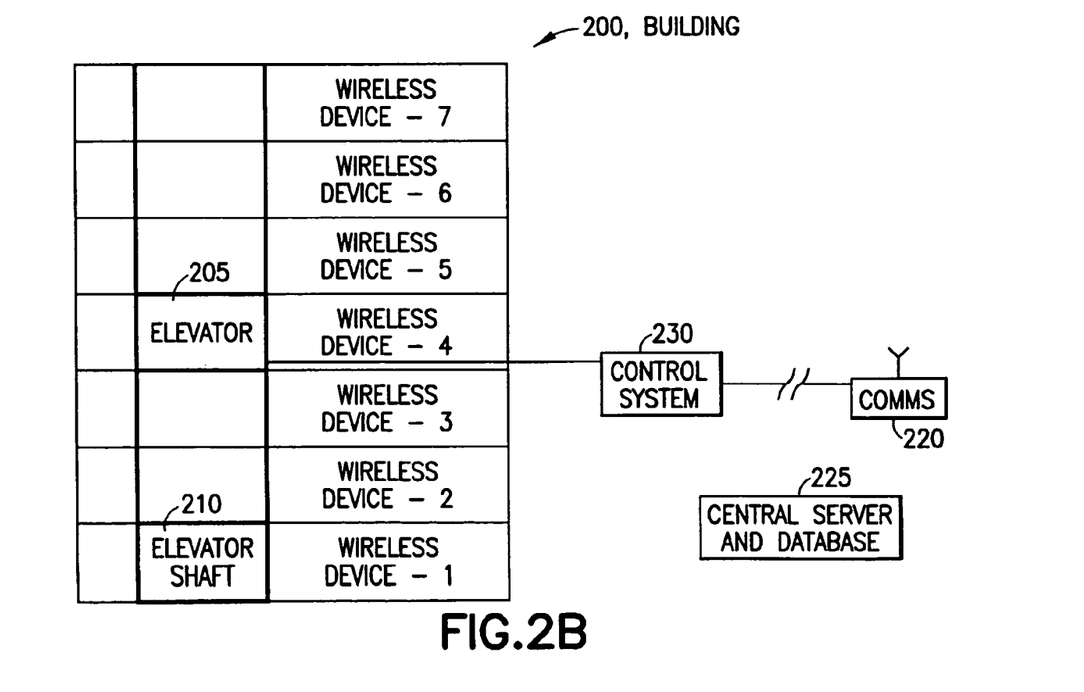
FIG. 2B shows an overview of a method of determining an indoor location of a user of a mobile device, in accordance with the exemplary embodiments.

A number of options exist for determining the XYZ location within a building, such as the SiRFstar, SiRFusion and SiRFprimall products from CSR. An alternative approach is shown in FIG. 2B. Here wireless routers and/or access points, for example an IEEE802.11 WLAN router or access point, are featured on each floor. This is increasingly the case as offices install such wireless communications infrastructure. Each wireless router or access point 1-7 has its own unique identification code. As each floor will usually be associated with a number of specific routers, a unique radio fingerprint can be formed for each floor by utilizing sensor readings collected by the elevator. The resulting unique radio fingerprint derived for each floor may accordingly be associated with a physical floor number. This may be achieved as it is usual for elevator systems to have embedded sensors such that the elevator system can determine which floor the elevator is on. This information can then be correlated against the radio fingerprint for a specific floor. The received power of each wireless router will vary according to the distance of the mobile devices from each wireless router.

In accordance with an exemplary embodiment of the invention, there is determining the floor preference of a user and comparing the floor preference to a typical radio fingerprint profile of the user with that formed by the elevator for each floor. The assumption is that the radio fingerprint of a user's "anchor" in a given building will be closer to the radio fingerprint formed by the elevator for the same floor, as compared to radio fingerprints formed for other floors. For large buildings where the overlap can be very small, in accordance with the embodiments, the MD10 can determine a vertical movement indicating that the user of the MD10 is in an elevator. Further, in accordance with the embodiments, the MD 10 can over time identify that a radio fingerprint associated with the context when the vertical movement transforms to horizontal movement (this would be the moment when the user starts walking from the elevator toward their office or home).

Figure 6:
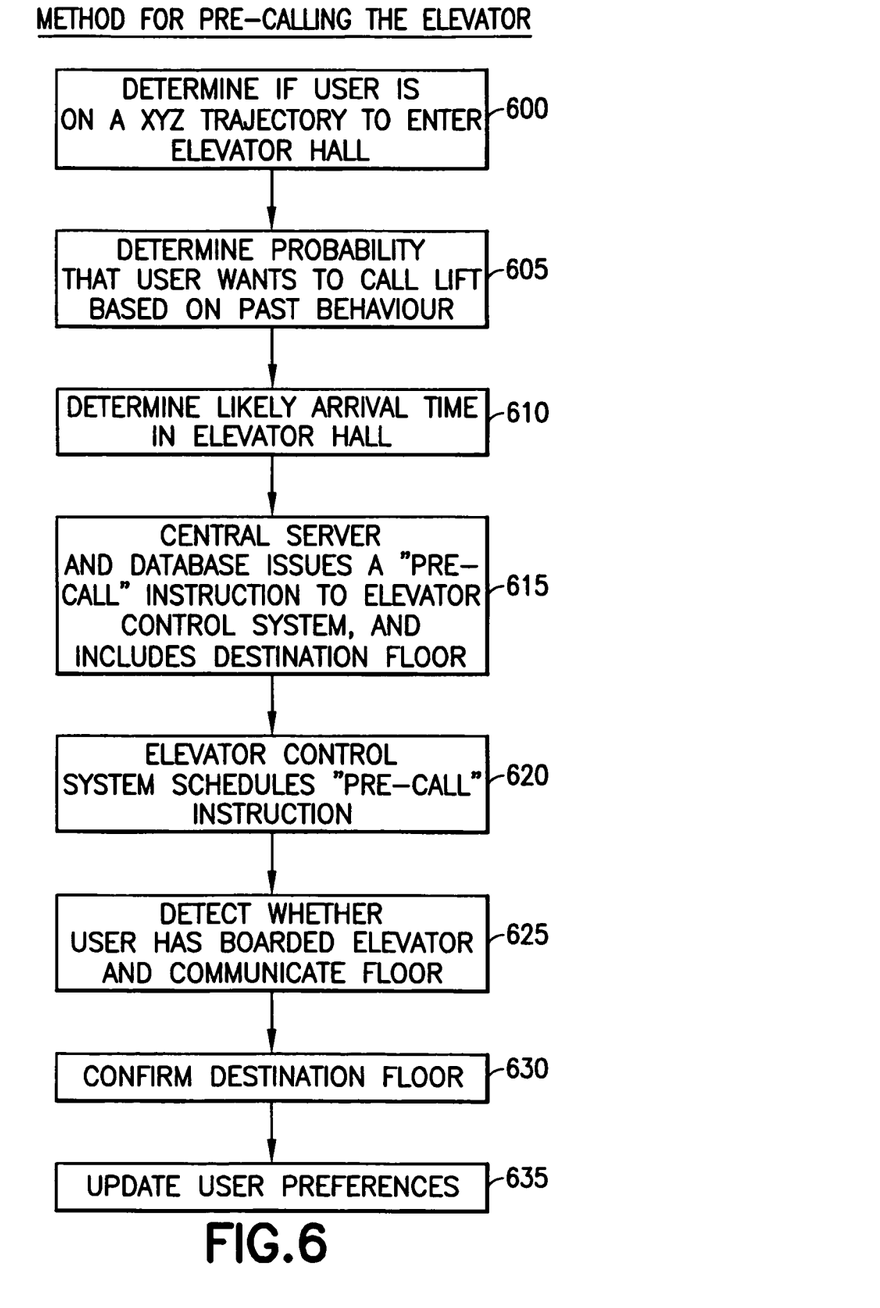
FIG. 6 is a block diagram which shows an operation of a method, and a result of execution of computer program instructions embodied on a computer readable memory, in accordance with the exemplary embodiments of this invention.

FIG. 6 illustrates a method in accordance with an exemplary embodiment of the invention. As shown in block 600 of Figure the central server and database tracks a user's XYZ trajectory to determine if user's current geo-routine is, based on their historical behavior, as stored in the database 10-DB. In accordance with the exemplary embodiments of the invention, the determinations can be triggered by factors including the user's XYZ trajectory. In addition, the embodiments provide that specifics regarding distances to elevators, such as for probability determinations or distance values related to the trajectory, may trigger the optimization for example. For example, in accordance with the exemplary embodiments, a user's approach towards the elevator site and/or a speed of the approach may be used to determine when the elevator should be called in respect to similar attributes of other users who may also be approaching.

Based on the determined probability as indicated in Block 605 that the user's destination is an elevator hall, as shown in block 610 the user's arrival time in the elevator hall is determined. The determination is performed in consideration of a temporal or chronological context, such as based on historical and/or current behavior of the user of the MD10. Further, the central server determines a probability that the user is intending to use the elevator 205 and the likely floor of their destination. The probability that a user wants to use or call an elevator is determined based on a number of factors including past behaviour and current context. Other factors may also be considered.

Once the probability (or likelihood) has been determined, it is necessary to determine whether it is of sufficient magnitude to call the elevator. This can be achieved in a number of ways. For example, a predefined threshold may be set, with the elevator being called if the measure of the probability of the elevator being needed by the user exceeds the predefined threshold which has been set. The predefined threshold may be defined in a number of ways, including statistical analysis of the determined likelihood of a user requiring the elevator and the actual likelihood of the user requiring the elevator.

In addition, there are a number of threshold setting alternatives, some of which are listed below:

1) Dynamically adapt the threshold according to the measured "false call" and "false reject" rates. In this instance, if the elevator is not called and it is determined that the user does indeed wish to take the elevator, such as by monitoring their location, this is identified as a "false reject". If the elevator is called but the user does not wish to take the elevator, then this is "false call". By monitoring the "false call" and "false reject" rates, the threshold may be continuously adapted (including on a time variant basis) so as to try and minimize these factors. Optionally, additional analysis can be carried out to correlate the "false call" and "false reject" instances against measured user data such as location, trajectory, usage history, etc. to try and further adapt the system and improve its accuracy.

2) Whether the threshold is defined on a fixed, adaptive or other basis a number of further options exist. A policy may be associated with each threshold level (as there may be more than one). The policy may define different call criteria according to the likelihood of the approaching user to require its use. For example, a user who is just above the lowest threshold level may be trigger a "low priority" policy which calls the elevator but only if it is within one floor of the user's entry point and no other users are approaching.

3) A continuous scaling approach may be used, where other factors—such as the likely priority of the approaching user—are computed in the context of the likely needs of other approaching users which produces an output which is compatible with the existing scheduling system of the elevator.

If the probability that the user is intending to use the elevator exceeds a predefined threshold, then the central server and database communicates the expected arrival time of the user to the control system of the elevator in the form of a "Pre-call" instruction together with their likely destination floor, as shown in Block 615. As indicated in Block 620, the control system then schedules an elevator event such that, other users permitting, the elevator is scheduled to arrive on the same floor at the same location as the user at the same time. Further, as shown in Block 626, in accordance with the embodiments, an NFC module or modules, such as the NFC 10-G1, 10-G2, and/or 10-G3; or other close proximity communication systems is then used to determine that the user has entered a lift. Then as indicated in Block 630 the user and/or the MD 10 is invited to confirm the destination floor which has been passed to the elevator control system as part of the "pre-call" information. The user exits at the designated floor and, as indicated in Block 635, the user's preferences are then updated accordingly via the mobile devices.

In the event that multiple users request the lift at a similar time, then other elevator scheduling algorithms may be used to schedule the elevator. Further, in accordance with the embodiments, these algorithms may be refined and their performance increased by taking additional XYZ geo-routing information from a central server, such as the server 31. In accordance with the exemplary embodiments:

Alternative ways of travelling between building floors can be offered if the wait time for an elevator exceeds the walk time, for example.

Users can be directed to alternative elevators where more than one exists and clustered together according to destination.

As a user's destination is known before they enter an elevator, this information can be used by the server 31 to enhance scheduling for subsequent users. Such as users who require an elevator to start from the first user's destination point, for example.

Figure 3:
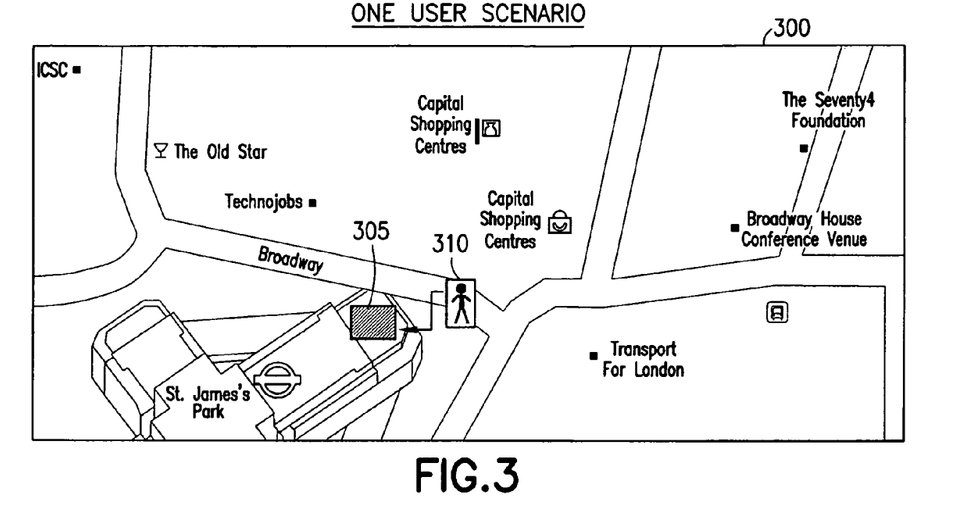
FIG. 3 shows a scenario with a single user approaching an elevator at a defined location, in accordance with the exemplary embodiments.

The first use case is illustrated in FIG. 3. Here a user 310 walks along a road called Broadway. The user is following an established geo-routine, the attributes of which has previously been stored, and can be accessed by the user's mobile device. Accordingly as the user 310 walks in an area 300 along Broadway, for example, and makes his way to the St. James's Park building 305. In accordance with the embodiments, it can be determined that they are following a route that has been previously used, and may therefore be expected to repeat the same actions as when the route was previously used. It should be noted that this information can be temporal in nature, and that this can be one of the characteristics used to determine the likelihood of a user repeating actions carried out on previous spatially similar routes.

In this instance, it is computed by the central server with at least a database of historical geo-routines that when the user previously adopted a similar geo-routine at a similar time, the user 310 stopped at the St. James's Park building 305, and caught a lift or elevator from the ground floor to the $4^{th}$ floor. In accordance with the exemplary embodiments, a probability of the user 310 entering the building 305 to use the elevator may be determined at this time. Such determining may be performed using historical geo-routines of the user 310 as stored in the database. Then the probability can be evaluated using a threshold for example. In this example, the probability has been evaluated to indicate that the user 310 will most likely use the elevator. As the user 310 approaches the St. James's Park building, the central server and database fetches the current position of the elevator from the lift controller together with the current queue status. If no other users are waiting for the elevator, an elevator event is triggered by the central server and database such that the arrival of the elevator on the ground floor is synchronized with the estimated arrival time of the user wishing to travel to the $4^{th}$ floor.

As the user enters the elevator, their proximity is detected by inductive means such as with an NFC. In addition, in accordance with the exemplary embodiments, their proximity to the elevator could be determined by matching the radio fingerprint information of a phone of the user and the elevator's ground floor fingerprint. Using this or a local or cellular wireless connection, the historical, and perhaps time dependent, floor preference of the user 310 is then communicated to the elevator control system. The elevator control system then transports the user 310 to the $4^{th}$ floor. Any action by the user 310 to press any of the physical controls of the lift will communicate directly with the lift control system and interrupt and/or over-ride any previously inferred automated setting.

Use Case 2

Figure 4:
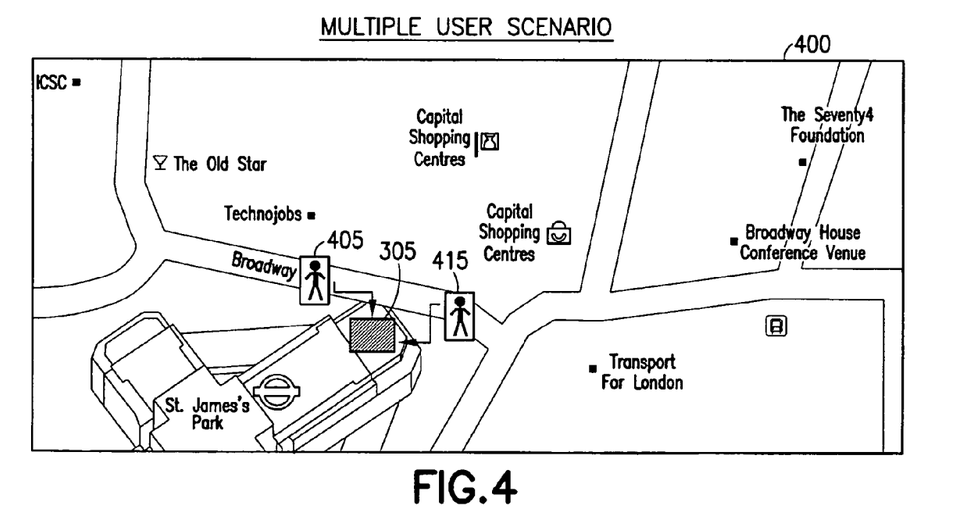
FIG. 4 shows a scenario with two users approaching an elevator at a defined location, in accordance with the exemplary embodiments.

FIG. 4 illustrates a scenario where the geo-routines of two users 405 and 415 mean that their trajectories coincide at the entrance to the lift hall in St. James's Park 305 building at similar times. In this scenario the user's geo-routines may be tracked by the central server and database. This triggers two elevator events to the elevator control system, which then schedules the arrival of the elevator. For example, it is determined that the user 415 is travelling from the car park towards the elevator, while the user 405 is travelling up to the $10^{th}$ floor. It is however also determined that on the $10^{th}$ floor a third user has a trajectory that is approaching the elevator and that, possibly temporally, this third user is also likely to want to travel to the car park. This information is used by the elevator controller to schedule a journey which synchronizes the elevator with the arrival of both the users 405 and 415. The synchronization including that the elevator control system instructs the elevator such that it is timed to transports both the users, such as to the $10^{th}$ floor, before returning with the third user to the car park. The user 415 is accommodated first allow the user to return from the car park, as it is determined by the server that this will take less time than the wait time for the elevator. Further, in accordance with the embodiments, if it is determined that the return from the car park will take longer than the wait time then the elevator schedule may be optimized with the server to synchronize the travel of user 405 and the third user before the elevator is scheduled for the user 415 returning from the car park.

Use Case 3

Figure 5:
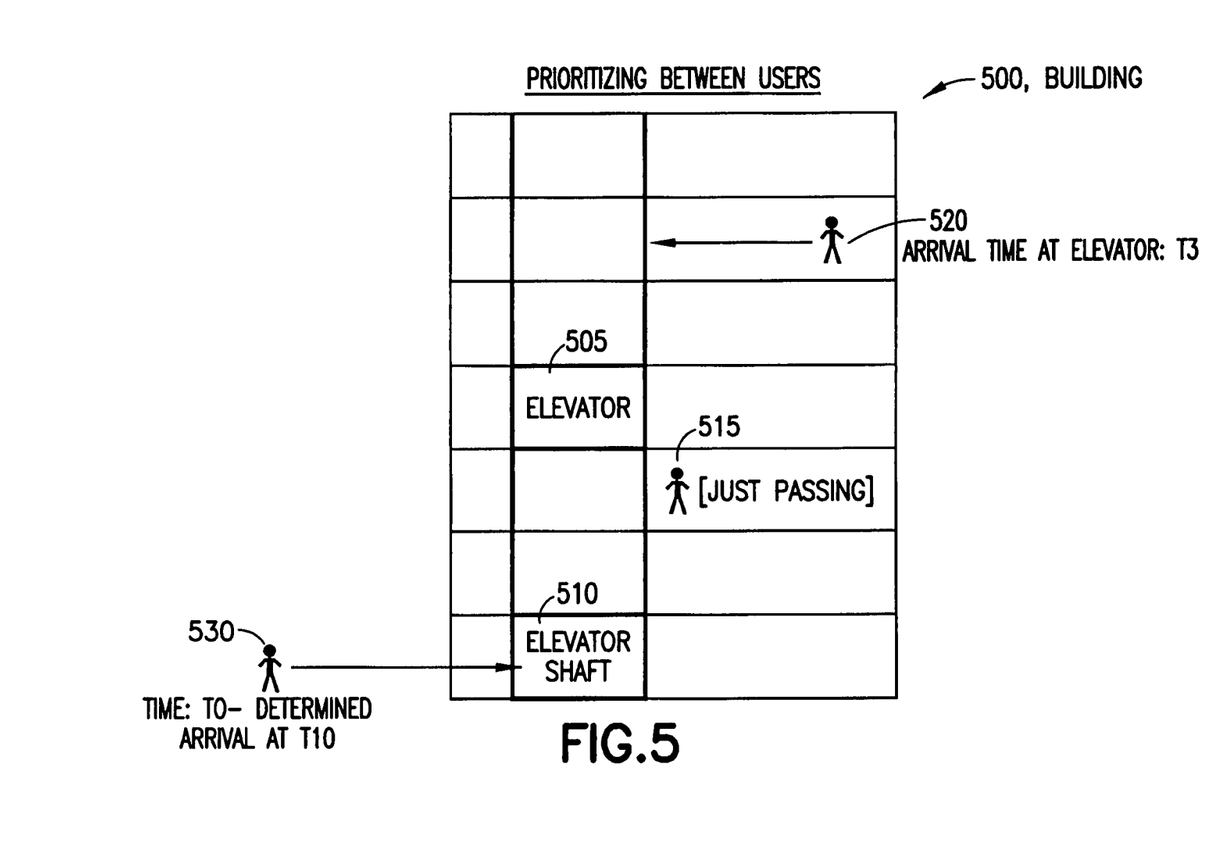
FIG. 5 shows operations of prioritizing scheduling between multiple users, in accordance with the exemplary embodiments of the invention.

In FIG. 5, at t=0, a first user 530 is determined to be on the ground floor with a slow moving trajectory towards the elevator 505 (e.g., elevator shaft 510). In this scenario it is determined, by the server using the database, that user 530 has historical track record of using the elevator at this time of day. On the $3^{rd}$ floor, a second user 515 has a trajectory towards the elevator 505 but has no historical record of using the elevator at this time of day. On the $5^{th}$ floor, a third user 520 is determined to be on a fast trajectory towards the elevator. It is determined that user 520 has a historical record of using the elevator frequently at different times of the day, and that user 520 usually travels to the $1^{st}$ floor.

The geo-routine trajectory of the first user 530 is calculated to place him at the elevator by t=10. The second user 515 has no historical record of using the elevator at this time, and the central server has determined, with the database, that user 515 is just passing the elevator. The third user 520 is projected to arrive at the elevator on the $5^{th}$ floor at t=3. The central server and database issues "pre-call" instructions to the elevator control system for user 1 and user 3, whereby the elevator travels to the $5^{th}$ floor to collect the third user at t=3. As it approaches the $3^{rd}$ floor, the location of the second user 515 is again evaluated to determine whether he is waiting for the elevator. The lift proceeds accordingly and arrives on the ground floor by t=10 to collect the first user.

The addition of geo-routines to the scheduling of elevators allows the anticipated use of an elevator system by one or more users to be computed. As a result waiting time is decreased as the elevator can be "pre-called" or other options presented to the user. This increase in efficiency in scheduling of elevator systems helps users more effectively navigate around a building, and potentially decreases travel time. It also becomes easier to cluster the elevator travel needs of users with similar geo-routines together, meaning increased elevator utilization and further helping to decrease waiting times for users.

Use Case 4

In another non-limiting example, it may be determined that a high speed elevator going across few floors with few users is likely to be able to be called much later than a slow elevator serving many floors with many users. Assume for example that a high speed elevator is located in a building which has 5 floors and which has a speed of 1 floor/second. It is known that a time required for the elevator to start or stop is 5 seconds, and it is determined that the elevator currently is on the $3^{rd}$ floor. In addition, it is determined that the maximum travel time of the elevator is 5 seconds, with an additional five seconds for the elevator to be started or stopped making a maximum total of 15 seconds. The elevator services five floors.

In this use case example, two users are approach the elevator hall on different floors. User A is 100 meters from the elevator on the ground floor and approaching in a straight line at 1.3 m/sec with an estimated arrival time at the elevator hall of 39 seconds. User B is 20 meters from the elevator on the $5^{th}$ floor and approaching in a straight line at 1.4 m/sec with an estimated arrival time at the elevator hall of 15 seconds. It is determined with historical geo-routines of User B that User B historically travels to the ground floor.

In accordance with the embodiments, User B is detected and found to be on a route and context indicating that which would usually result in them calling the elevator, the elevator is called to the $5^{th}$ floor. This context can be the result of a determined probability exceeding a threshold and/or a determination using historical geo-routines of the user. It is known that the elevator travel time from the $3^{rd}$ floor to the $5^{th}$ floor will be (5+5+2=12) 12 seconds. It is also computed that the elevator will take about a further (5+5+5=15) 15 seconds to reach the ground floor with a further 10 seconds allowed for user B to enter on the $5^{th}$ floor. As a result the elevator will arrive on the ground floor a total of (12+10+15=37) 37 seconds after the geo-routines of Users A and B, and other characteristics, are used for the pre-call of the elevator. As a result the elevator arrives on the ground floor in time to collect user A whilst dropping User B off at their chosen destination.

It will be appreciated that the embodiments of the invention make use of scheduling and other algorithms which may already be used to schedule and optimise a routing of elevators between floors.

Use Case 5

As stated above, the exemplary embodiments of the invention can also be practiced to the benefit of other transportation systems as well as elevators. In accordance with the exemplary embodiments, use of a train or tram system, as an example, could be optimized based on current and/or historical geo-routines of users with mobile devices that use the tram. The geo-routines can be identified, as described above, using X-Y coordinates and Z altitudes of the at least one user and using radio fingerprints of the tram, or a vehicle of the tram. In accordance with the embodiments as described above, these fingerprints can be based at least upon the stop or platform which the users are entering and/or leaving the tram and an altitude of the stop or platform. These platforms can be a various altitudes and be positioned on any side of the vehicle, in this case the train or tram. Further, in accordance with the embodiments as at least described above, the current and or historical geo-routines of the users of the tram can be used to determine pre-call instructions and the pre-call instructions can be sent to the tram scheduling system by the server and/or the user for use in optimizing the use of the tram. Similarly, other transportation systems can benefit from the exemplary embodiments of the invention.

Figure 7:
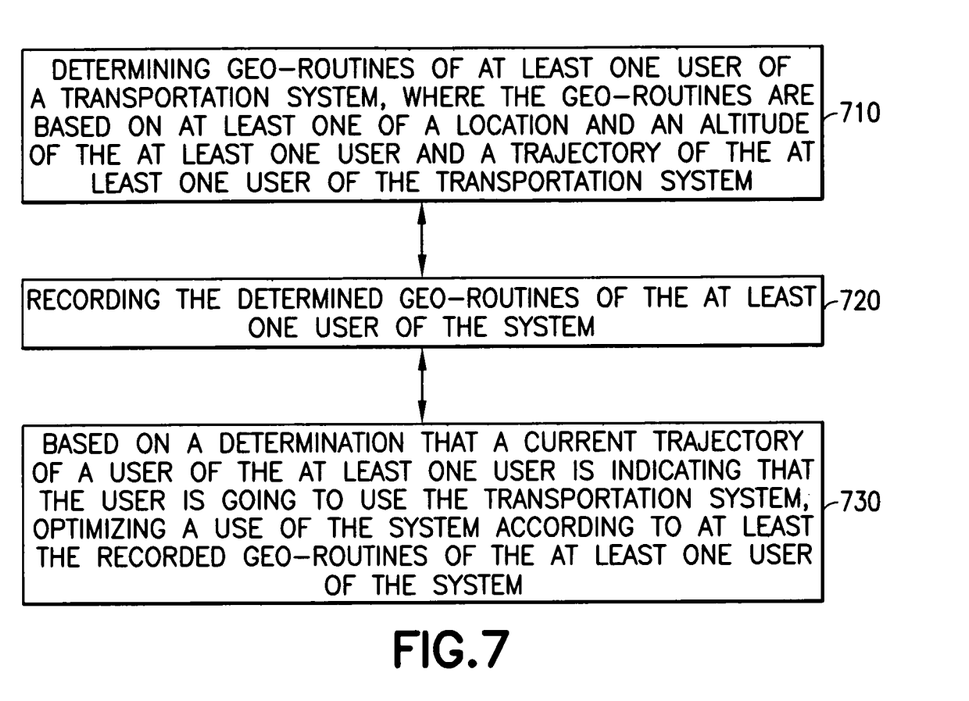
FIGS. 7 and 8 are a logic flow diagrams that each illustrate the operation of a method, and a result of execution of computer program instructions embodied on a computer readable memory, in accordance with the exemplary embodiments of this invention.
Figure 8:
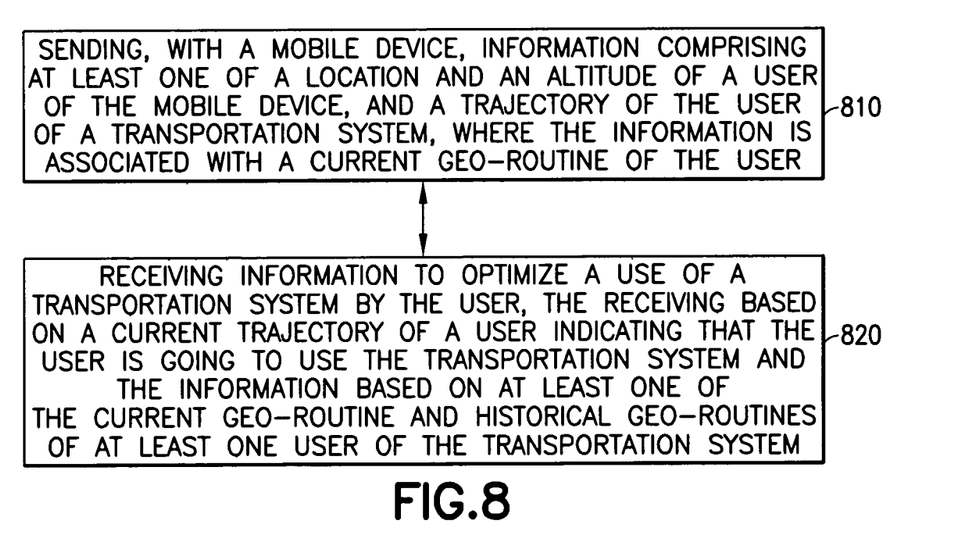

FIGS. 7 and 8 include block diagrams illustrating a method which may be implemented by an apparatus in accordance with the exemplary embodiments of the invention.

Consider FIG. 7, which describes some non-limiting embodiments from the perspective of the server which eventually transmits the pre-call instructions in order to optimize the transportation system. FIG. 7 may be from the perspective of the Server 31 or the Network Node 10-2 or any other similarly configured network node. In accordance with the exemplary embodiments of the invention described herein, Block 710 indicates a step of determining geo-routines of at least one user of a transportation system, where the geo-routines are based on at least one of a location and an altitude of the at least one user and a trajectory of the at least one user of the transportation system. Block 720 indicates a step of recording the determined geo-routines of the at least one user of the system. Then in Block 730 there is indicated a step, based on a determination that a current trajectory of a user of the at least one user is indicating that the user is going to use the transportation system, of optimizing a use of the system according to at least the recorded geo-routines of the at least one user of the system.

In accordance with the exemplary embodiments described in the paragraph above, the geo-routines of the at least one user comprises at least one X-Y coordinate and a Z altitude of the at least one user, and where the optimizing is performed upon determining that the trajectory of the at least one user is associated with a vehicle of the transportation system.

In accordance with the exemplary embodiments described in the paragraphs above, there indicating where the optimizing the use of the transportation system is according to a current position and a current queue status of the transportation vehicle.

In accordance with the exemplary embodiments described in the paragraphs above, the geo-routines are determined based on at least an altitude of at least one platform of more than one platforms serviced by the transportation system on which the at least one user approaches or leaves a vehicle of the system, and where a radio fingerprint is determined using signaling from both a mobile device of the user and sensors located on each of the more than one platforms serviced by the vehicle.

Further, in accordance with the exemplary embodiments described in the paragraphs above, there is associating the user with the at least one platform, where the associating is based on a radio fingerprint of the vehicle formed when the user approaches or leaves the vehicle on the at least one platform.

In accordance with the exemplary embodiments described in the paragraphs above, the associating comprises comparing the radio fingerprint to other radio fingerprints of the vehicle formed on other platforms of the at least one platform. Or, in accordance with the paragraphs above, the associating comprises at least one of determining that the trajectory of the user is vertical, and forming the radio fingerprint of the vehicle when the vertical trajectory of the user transforms to a horizontal trajectory.

In addition, in accordance with the exemplary embodiments described in the paragraphs above, the transportation system comprises more than one vehicle and where the optimizing comprises determining with at least the recorded geo-routines a vehicle of the more than one vehicle that is preferred by the user.

In accordance with the exemplary embodiments described in the paragraphs above, the determining the geo-routines further comprises determining a probability that the user is likely to use the preferred vehicle, and determining whether the probability exceeds a pre-defined threshold.

In accordance with the exemplary embodiments described in the paragraphs above, for the case that the probability exceeds the threshold, further comprising forming a pre-call instruction and sending the pre-call instruction to the transportation system to optimize the use of the system, where the pre-call instruction comprises an estimated arrival time of the user at the vehicle and a likely destination platform of the user.

In accordance with the exemplary embodiments described in the paragraphs above, the optimizing the use of the transportation system is according to the recorded geo-routines and a current geo-routine of the at least one user of the system.

In accordance with the exemplary embodiments described in the paragraphs above, for a case it is determined that more than one user is likely to use a vehicle of the transportation system during a period of time, there is determining a location and a trajectory of each of the more than one user, and based on the determined location and trajectory of each of the more than one user, synchronizing a scheduling of the system such that all of the more than one users waits the least amount of time to use the vehicle.

In accordance with the exemplary embodiments described in the paragraph above, the synchronizing is based on an altitude of each of the more than one user, and based at least in part on a direction and speed of the trajectory of each of the users in relation to the vehicle.

In accordance with the exemplary embodiments described in the paragraphs above, the direction and speed and altitude of each of the users is used to determine an estimated arrival time and an access platform of each of the users, and the method further comprising forming a pre-call instruction and sending the pre-call instruction to the transportation system to optimize the scheduling of the transportation system, where the pre-call instruction comprises the estimated arrival time and the access platforms of each of the users.

Now consider FIG. 8, which describes some non-limiting embodiments from the perspective of the mobile device 10-1 or another mobile device which provides signaling and/or benefits from the operations to optimize the transportation system of the Server 31. In accordance with the exemplary embodiments of the invention described herein, at Block 810 there is the step of sending, with a mobile device, information comprising at least one of a location and an altitude of a user of the mobile device, and a trajectory of the user of a transportation system, where the information is associated with a current geo-routine of the user. Block 820 indicates the step of receiving information to optimize a use of a transportation system by the user, the receiving based on a current trajectory of a user indicating that the user is going to use the transportation system and the information based on at least one of the current geo-routine and historical geo-routines of at least one user of the transportation system.

In accordance with the exemplary embodiments as described in the paragraph above, it is indicated that the geo-routines of the at least one user comprises at least one X-Y coordinate and a Z altitude of the at least one user, and where the optimizing information is received in response to a trajectory of the at least one user associated with a vehicle of the transportation system.

In accordance with the exemplary embodiments as described in the paragraphs above, the geo-routines are based on at least one platform of more than one platform serviced by the system on which the at least one user approaches or leaves a vehicle of the transportation system, and a radio fingerprint of vehicle at each of the at least one platform.

In accordance with the exemplary embodiments as described in the paragraphs above, the user is associated with the at least one platform, where the user association is based on a radio fingerprint of the vehicle formed when the user approaches or leaves the vehicle at the platform.

In accordance with the exemplary embodiments as described in the paragraphs above, the associating is based on a comparison of the radio fingerprint to other radio fingerprints of the vehicle formed on other platforms of the at least one platform.

In accordance with the exemplary embodiments as described in the paragraphs above, the associating is based on the radio fingerprint of the vehicle when a vertical trajectory of the user of the vehicle transforms to a horizontal trajectory.

In accordance with the exemplary embodiments as described in the paragraphs above, the transportation system comprises more than one vehicle and where the optimizing information is based on a vehicle of the more than one vehicle preferred by the user, the preferred vehicle determined based on historical geo-routines of the user.

Further, in accordance with the exemplary embodiments as described in the paragraphs above, the optimizing information is based on a probability that the user is likely to use the preferred vehicle, and based on whether the probability exceeds a pre-defined threshold.

In addition, in accordance with the exemplary embodiments as described in the paragraphs above, the optimizing information comprises a pre-call instruction, where the pre-call instruction comprises an estimated arrival time of the user at the vehicle and a likely destination platform of the user.

Additionally, in accordance with the exemplary embodiments as described in the paragraphs above, the optimizing information is based on geo-routines of more than one user of the transportation system.

In FIGS. 7 and 8 the functions they represent are non-limiting examples, and may be practiced in various components such as integrated circuit chips and modules, and the exemplary embodiments of this invention may be performed by an apparatus that is embodied as an integrated circuit. The integrated circuit, or circuits, may comprise circuitry embodying at least one or more of a data processor or data processors, a digital signal processor or processors, baseband circuitry and radio frequency circuitry that are configurable so as to operate in accordance with the exemplary embodiments of this invention.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
    determining, by a device, geo-routines of at least one user of a transportation system, where the geo-routines are based on at least one of an altitude of the at least one user and a trajectory of the at least one user of the transportation system, and where the geo-routines are determined based on a radio fingerprint associated with the at least one user;
    recording, by the device, the determined geo-routines of the at least one user of the system, where the recorded determined geo-routines comprise historical geo-routines and current geo-routines of the at least one user; and
    based on a determination that a current trajectory of a user of the at least one user is indicating that the user is going to use the transportation system, optimizing, by the device, a scheduling of the system for the use by the user based on at least the recorded current geo-routine and historical geo-routines of the at least one user of the system.

2. The method according to claim 1, where the geo-routines are determined based on an altitude of at least one platform of more than one platform serviced by the transportation system on which the at least one user approaches or leaves a vehicle of the system, and where the radio fingerprint associated with the at least one user is determined using sensors located on each of the more than one platforms when the at least one user approaches or leaves a vehicle.

3. The method according to claim 1, where determining the geo-routines comprises associating the user with at least one platform of the transportation system, where the associating is based on matching a radio fingerprint of the vehicle formed with a sensor at the at least one platform to a radio fingerprint associated with the user when the user approaches or leaves the vehicle at the at least one platform.

4. The method according to claim 3, where the associating comprises at least one of comparing the radio fingerprint of the vehicle to other radio fingerprints of the vehicle formed on other platforms of the at least one platform and forming the radio fingerprint of the vehicle when a vertical trajectory of the user transforms to a horizontal trajectory.

5. The method according to claim 1, where the determining that the current trajectory of a user is indicating that the user is going to use the transportation system is based at least in part on a determined probability that the user is to use the vehicle and a determining that the probability exceeds a threshold, the method further comprising forming a pre-call instruction and sending the pre-call instruction to the transportation system to optimize the scheduling of the system, where the pre-call instruction comprises an estimated arrival time of the user at the vehicle and a likely destination platform of the user.

6. The method according to claim 1, where at least one of a direction and speed, and an altitude of each of the at least one user is used to determine an estimated arrival time and an access platform of the transportation system to be used by each of the users, and the method further comprising forming a pre-call instruction and sending the pre-call instruction to the transportation system to optimize the scheduling of the transportation system, where the pre-call instruction comprises the estimated arrival time and the access platforms of each of the users.

7. At least one computer readable memory embodying computer program code, the computer program code executed by at least one processor to perform the method according to any of claim 1.

8. An apparatus comprising:
    at least one processor; and
    at least one memory including computer program code, where the at least one memory and the computer program code are configured, with the at least one processor, to cause the apparatus to at least:
    determine geo-routines of at least one user of a transportation system, where the geo-routines are based on at least one of an altitude of the at least one user and a trajectory of the at least one user of the transportation system, and where the geo-routines are determined based on a radio fingerprint associated with the at least one user;
    record the determined geo-routines of the at least one user of the system, where the recorded determined geo-routines comprise historical geo-routines and current geo-routines of the at least one user; and
    based on a determination that a current trajectory of a user of the at least one user is indicating that the user is going to use the transportation system, optimize scheduling of the system for the use by the user based on at least the recorded current geo-routines and historical geo-routines of the at least one user of the system.

9. The apparatus according to claim 8, where the geo-routines are determined based on an altitude of at least one platform of more than one platform serviced by the transportation system at which the at least one user approaches or leaves a vehicle of the system, and where the radio fingerprint associated with the at least one user is determined using sensors located on each of the more than one platforms when the at least one user approaches or leaves a vehicle.

10. The apparatus according to claim 8, where determining the geo-routines comprises associating the at least one user with at least one platform of the transportation system, where the associating is based on matching a radio fingerprint of the vehicle formed with a sensor at the at least one platform to a radio fingerprint associated with the user when the user approaches or leaves the vehicle at the at least one platform.

11. The apparatus according to claim 10, where the associating comprises the at least one memory including the computer program code is configured, with the at least one processor, to cause the apparatus to at least one of compare the radio fingerprint of the vehicle to other radio fingerprints of the vehicle formed on other platforms of the at least one platform and form the radio fingerprint of the vehicle when a vertical trajectory of the user transforms to a horizontal trajectory.

12. The apparatus according to claim 8, where the determining that the current trajectory of a user is indicating that the user is going to use the transportation system is based at least in part on a determined probability that the user is to use the vehicle and a determining that the probability exceeds a threshold, and further comprising the at least one memory including the computer program code is configured, with the at least one processor, to cause the apparatus to form a pre-call instruction and send the pre-call instruction to the transportation system to optimize the scheduling of the system, where the pre-call instruction comprises an estimated arrival time of the user at the vehicle and a likely destination platform of the user.

13. The apparatus according to claim 8, where at least one of a direction and speed, and an altitude of each of the at least one user is used to determine an estimated arrival time and an access platform of the transportation system to be used by each of the users, and further comprising the at least one memory including the computer program code is configured, with the at least one processor, to cause the apparatus to form a pre-call instruction and send the pre-call instruction to the transportation system to optimize the scheduling of the transportation system, where the pre-call instruction comprises the estimated arrival time and the access platforms of each of the users.

14. The method according to claim 3, where the radio fingerprint associated with the user is based on a mobile device carried by the user.

15. A method comprising;
    sending, with a mobile device, information comprising at least one of an altitude of a user of the mobile device, and a trajectory of the user in a transportation system, where the information is associated with a current geo-routine of the user, and where the current geo-routine is based on a radio fingerprint associated with the user; and
    receiving information to optimize scheduling of a transportation system for a use of the transportation system by the user, the receiving based on a current trajectory of the user indicating that the user is going to use the transportation system and the information based on the current geo-routine and historical geo-routines of at least one user of the transportation system.

16. The method according to claim 15, where the geo-routines are based on at least one platform of more than one platform serviced by the system at which the user approaches or leaves a vehicle of the transportation system, and where the radio fingerprint associated with the user is formed with a sensor located at each of the at least one platform.

17. The method according to claim 15, where the user is associated with the at least one platform and where the associating is based on a radio fingerprint of the vehicle as compared to other radio fingerprints of the vehicle formed on other platforms of the at least one platform, and matching the radio fingerprint of the vehicle to the radio fingerprint associated with the user when the user approaches or leaves the vehicle at the at least one platform.

18. The method according to claim 15, where the indicating that the user is going to use the transportation system is based on a probability that the user is likely to use the preferred vehicle, and the probability exceeding a pre-defined threshold.

19. The method according to claim 15, where the optimizing information comprises a pre-call instruction, where the pre-call instruction comprises an estimated arrival time of the user at a vehicle of the transportation system and a likely destination platform of the user.

20. The method according to claim 15, where the optimizing information is based on geo-routines of more than one user of the transportation system.

21. At least one computer readable memory embodying computer program code, the computer program code executed by at least one processor to perform the method according to any of claim 15.

22. An apparatus comprising:
    at least one processor; and
    at least one memory including computer program code, where the at least one memory and the computer program code are configured, with the at least one processor, to cause the apparatus to at least:
    send, with a mobile device, information comprising at least one of an altitude of a user of the mobile device, and a trajectory of the user in a transportation system, where the information is associated with a current geo-routine of the user, and where the current geo-routine is based on a radio fingerprint associated with the user; and
    receive information to optimize scheduling of a transportation system for a use of the transportation system by the user, the receiving based on a current trajectory of the user indicating that the user is going to use the transportation system and the information based on the current geo-routine and historical geo-routines of at least one user of the transportation system.

23. The apparatus according to claim 22, where the at least one memory including the computer program code is configured, with the at least one processor, to cause the apparatus to base the geo-routines on at least one platform of more than one platform serviced by the system at which the user approaches or leaves a vehicle of the transportation system, and on the radio fingerprint associated with the user formed with a sensor located at each of the at least one platform when the user approaches or leaves the vehicle at the at least one platform.

24. The apparatus according to claim 22, where the user is associated with the at least one platform and where the associating comprises the at least one memory including the computer program code is configured, with the at least one processor, to cause the apparatus to form a radio fingerprint of the vehicle as compared to other radio fingerprints of the vehicle formed on other platforms of at least one platform, and to match the radio fingerprint of the vehicle to the radio fingerprint associated with the user when the user approaches or leaves the vehicle at the at least one platform.

25. The apparatus according to claim 22, where the indicating that the user is going to use the transportation system is based on a probability that the user is likely to use the preferred vehicle, and the probability exceeding a pre-defined threshold.

26. The apparatus according to claim 22, where the optimizing information comprises a pre-call instruction and where the pre-call instruction comprises an estimated arrival time of the user at a vehicle of the transportation system and a likely destination platform of the user.

27. The apparatus according to claim 22, where the optimizing information is based on geo-routines of more than one user of the transportation system.

* * * * *

UNITED STATES PATENT AND TRADEMARK OFFICE
CERTIFICATE OF CORRECTION

| | |
|---|---|
| PATENT NO. | : 9,323,232 B2 |
| APPLICATION NO. | : 13/418789 |
| DATED | : April 26, 2016 |
| INVENTOR(S) | : Jan O. Blom et al. |

It is certified that error appears in the above-identified patent and that said Letters Patent is hereby corrected as shown below:

In the Claims

In Claim 8:

Column 16, line 46, "scheduling" should be deleted and -- a scheduling -- should be inserted.

Signed and Sealed this
Twenty-eighth Day of June, 2016

Michelle K. Lee
*Director of the United States Patent and Trademark Office*